Patented Feb. 23, 1937

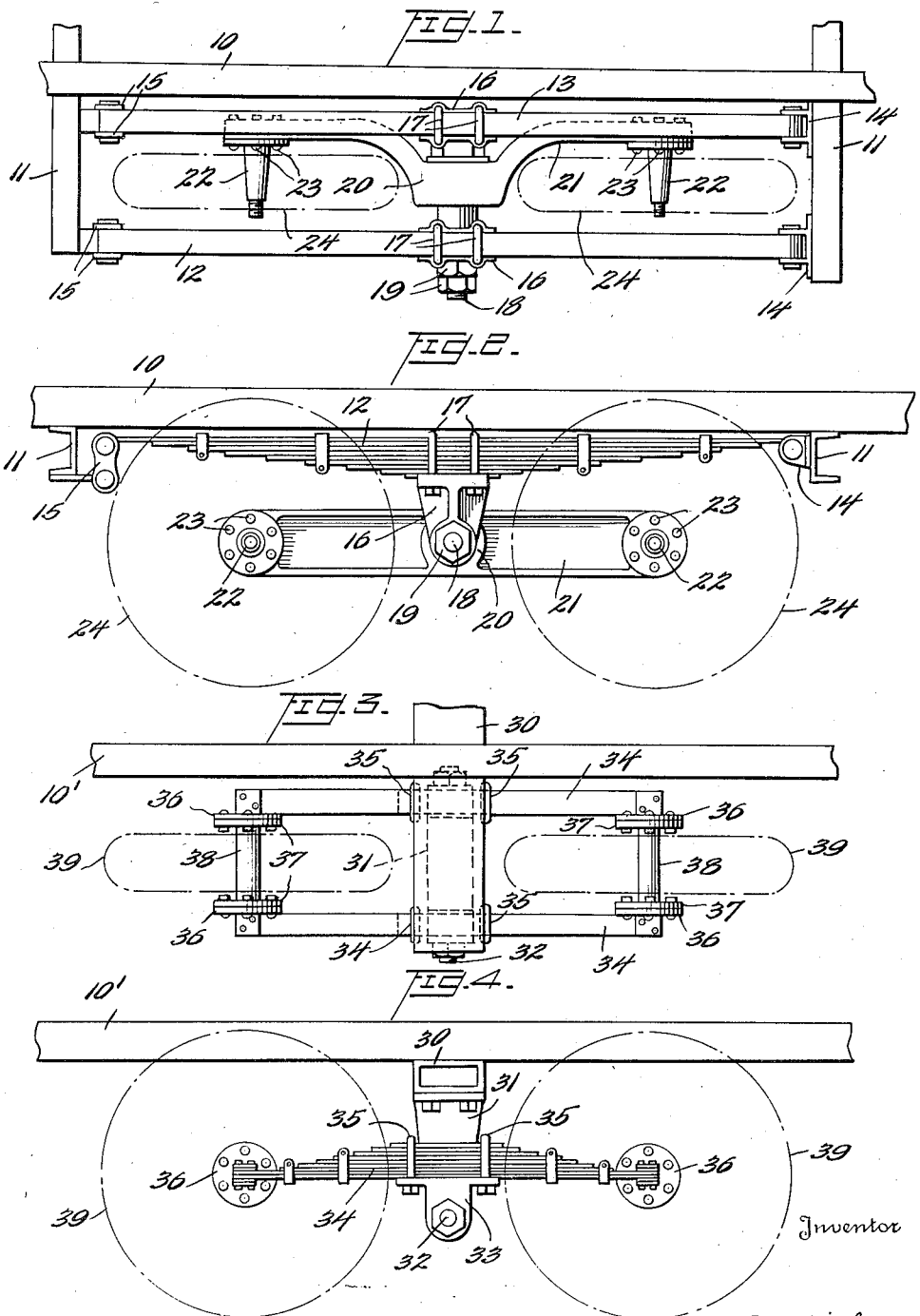

2,071,480

UNITED STATES PATENT OFFICE 2,071,480

VEHICLE SUSPENSION MECHANISM

Allison R. Williams, Chevy Chase, Md.

Application September 11, 1933, Serial No. 688,994

4 Claims. (Cl. 280—124)

This invention relates to vehicle suspension mechanisms and particularly to spring suspensions for motor vehicles.

Motor vehicles such as trucks, buses, and trailers are frequently driven at high speeds over relatively rough roadways, and it has long been the object of automotive engineers to perfect a spring suspension for such vehicles, as well as for automobiles, which will reduce to a minimum the shocks transmitted to the chassis of such vehicles due to passage of the wheels over obstructions and inequalities. Among suggestions heretofore advanced was the proposal that, by mounting two wheels in tandem upon the ends of a horizontally disposed element pivotally mounted, at an intermediate point, upon means connected to the vehicle wheel or chassis, at each side thereof, the magnitude of the shocks might be reduced, particularly when the connection between the pivotal mounting and the chassis includes a substantial spring. Spring suspensions of this general type have been manufactured and actually put into use. It has generally been considered necessary heretofore, however, to retain the customary axles, which extend in parallelism transversely of and beneath the chassis, the ends of these axles in reality being passed through the ends of the pivoted elements respectively, the axles having mounted upon their projecting ends the wheel carrying stub axles.

I have found it to be advantageous, however, to construct a spring suspension mechanism of this general character without the customary transverse axles heretofore deemed essential and to actually mount the wheel carrying stub axles directly upon the ends of the respective pivotally mounted fore and aft elements. By such arrangement not only is the unsprung weight of the vehicle reduced but various other advantages realized. Thus, in a construction such as I contemplate, it is assured that the wheels will remain at all times in planes parallel to the direction of movement of the vehicle, thereby preventing lateral scraping of the tires upon the roadway and excess wearing of the treads thereof.

In vehicles equipped with generally similar spring suspensions, but which have transversely extending continuous axles, it is found that the wheels will not remain parallel to the direction of travel of the vehicle when one pair of wheels is deflected upwardly to a greater extent than the other pair due to meeting with some obstruction in the road. This is true, even when the ends of the axles are connected by pivotally mounted rigid members, or by springs, extending parallel to the longitudinal axis of the vehicle. In the case of some constructions of the prior art, the tandem wheels at one side of the vehicle will spread apart upon meeting an obstruction, while the wheels at the other side will not, thus putting the wheels in position to develop a turning moment tending to alter the course of the vehicle. This is not only dangerous but increases wear of the tires. In other instances, as where the pairs of wheels are positively tied together, unequal spring deflections upon the two sides of the vehicle, respectively, result in a small movement of the two wheels upon one side, either forwardly or rearwardly, relatively to the wheels upon the opposite side, the axles remaining in parallelism. As a result all four wheels temporarily assume positions slightly inclined to the axis of the vehicle, which is of course highly undesirable. Such misalignments of the wheels cannot occur where the wheels are connected to the chassis in accordance with the present invention.

Likewise the novel spring suspension which forms the subject matter of the present invention permits slight lateral rocking movement of the stub axle and wheels of the vehicle in planes transverse to the vehicle when the vehicle is rounding curves, thus eliminating to a very large extent lateral sliding or scraping of the tires on the roadway. It is known that this lateral scraping of the tires, due to centrifugal forces developed in rounding curves, is highly detrimental and is one of the greatest causes of early tire failure.

While the invention is particularly useful when applied to trailers in which the wheels are not dirigible and in which the wheels are not driven, it may with only slight changes be applied to the driving wheels of trucks or to the steering wheels of motor vehicles of all kinds, it being easily possible to apply driving mechanisms or to mount the stub axles for rotation about vertical axes for steering purposes. In applying the invention, the design and arrangement of its component elements may be considerably modified to suit various types of vehicles. In the accompanying drawing two forms of the invention are illustrated, but it will be understood that these are set forth by way of example only.

In the drawing:

Figure 1 is a top plan view of a portion of the side frame of the vehicle showing the novel spring suspension applied thereto;

Figure 2 is a side elevation of the same;

Figure 3 is a view similar to Figure 1 of a slightly modified form of suspension embodying the invention; and Figure 4 is a side elevation of the suspension shown in Figure 3.

Referring first to Figures 1 and 2. Here one side frame member or sill of the vehicle is indicated at 10 and transverse laterally projecting frame members of channel form at 11. Spaced parallel elongated springs of the cantilever type are indicated at 12 and 13, respectively, corresponding ends of these springs being connected by fixed shackles 14 to one of the transverse members 11, and the opposite ends of the springs being connected to the second transverse member 11 by the rocking shackles 15. Secured centrally to each spring is a downwardly projecting bracket 16, any suitable securing means being provided, such for instance as the spring clips 17. At their lower ends these brackets are provided respectively with coaxial cylindrical apertures to receive a transversely extending bolt 18 which is fixed in position by means of an enlargement at one end (not illustrated) and by nuts 19 at the other. Rockably mounted upon the central portion of the pivotal shaft or bolt 18 is the hub 20 of rocking element 21, to the opposite ends of which stub axles 22 are detachably secured by means of bolts 23, the stub axles being positioned equidistantly from the axis of pivot 18, and the axes of the stub axles being parallel to the axis of this pivot. Wheels 24 are rotatably mounted upon the stub axles.

In the form of the invention shown in Figures 3 and 4, the side frame members of the vehicle, one of which is indicated at 10', have secured thereto transversely extending beam 30, to the under side of which the bracket 31 is bolted or otherwise secured. Adjacent its lower end the bracket is provided with a horizontally extending cylindrical aperture to receive a short shaft, pivot, or bolt 32, the ends of which project beyond the bracket on both sides and upon which projecting ends are rockably mounted the spring engaging and supporting blocks 33. The flat upper surfaces of these blocks are connected to springs 34, respectively, by means of spring clips 35, and to the ends of springs 34, which are disposed in parallel relationship, are secured circular discs or plates 36. Bolted to plates 36 respectively are the end plates 37 of wheel axles 38 upon which wheels 39 are rotatably mounted.

In the case of the form of the invention shown in Figures 3 and 4, the springs 34 comprise the rocking elements which correspond to the rocking element 21 of the form of the invention first described. In both cases the rocking elements rock vertically about the transverse horizontal axes of the supporting pivots as the wheels successively pass over obstructions. In the case of the last described embodiment, the rocking elements likewise comprise the springs and largely absorb the shocks due to inequalities in the roadway. In the first described embodiment the rocking element is a solid continuous piece, and the resilient portion of the means which connects the stub axles to the frame comprises the springs 12 and 13 which are positioned above the rocking element and directly connected to the chassis.

In both forms of the invention the use of continuous axles extending transversely of the chassis is avoided, and the wheels are so mounted that slight rocking movement of the stub axles in vertical planes transverse to the direction of travel is permitted. In the case of the first form of the invention, side thrust of the vehicle as it rounds a curve will cause upward deflection of one spring on each side of the vehicle and downward deflection of the other two springs, thus permitting the pivot shaft 18 to rock and hence permitting rocking movement of the stub axles 22 and wheels 23. In the case of the form of the invention shown in Figures 3 and 4, side thrust of the vehicle will naturally not result in rocking movement of the pivot shaft 32 but will cause upward deflection to a slight extent of the ends of one spring on each side of the vehicle and downward deflection of the ends of the associated springs, thus permitting slight rocking movements of the stub axles. This is very helpful in preventing sliding of the tires. The springs are, of course, sufficiently stiff to prevent excessive rocking movements of the wheel axles.

Having thus described the invention, what is claimed as new and desired to be secured by Letters Patent is:

1. In a vehicle suspension mechanism, a frame member, two longitudinally spaced parallel stub axles having wheels rotatably mounted thereon respectively, an independent pivot having its axis parallel to the axes of the stub axles, said pivot being relatively short and being unconnected to any similar pivot save through the vehicle frame, a rigid element mounted on the pivot for rocking movement in a plane transverse to the stub axles, the stub axles being rigidly fixed on said element, and laterally spaced longitudinally extending springs attached to and connecting the pivot and frame member.

2. In a vehicle suspension mechanism, a frame member, two spaced parallel stub axles having wheels rotatably mounted thereon respectively, an independent pivot having its axis parallel to the axes of the stub axles, said pivot being relatively short and being unconnected to any similar pivot save through the vehicle frame, an element mounted on the pivot for rocking movement in a plane transverse to the stub axles, the stub axles being rigidly fixed on said element, and means connecting the pivot and frame including two laterally spaced springs which permit relative movement of pivot and frame.

3. In a vehicle suspension mechanism, a frame member, two spaced parallel stub axles having wheels rotatably mounted thereon respectively, an independent pivot having its axis parallel to the axes of the stub axles, said pivot being relatively short and being unconnected to any similar pivot save through the vehicle frame, an element mounted on the pivot for rocking movement in a plane transverse to the stub axles, the stub axles being rigidly fixed on said element, and means connecting the pivot and frame including two laterally spaced springs each parallel to the frame member, and a bracket fastened to the springs centrally thereof and engaging the pivot.

4. In a vehicle suspension mechanism, in combination, a frame member, laterally spaced springs attached thereto, two longitudinally spaced parallel stub axles, a wheel rotatably supported on each stub axle, an elongated rigid element upon which the stub axles are rigidly fixed, and a transversely extending pivot connected to said springs and upon which said element is rockably mounted at a point between said stub axles, said pivot being parallel to said stub axles and being unconnected to any similar pivot save through the springs and vehicle frame, whereby said element, stub axles and wheels may move in a plane normal to the axis of said pivot.

ALLISON R. WILLIAMS.